US012741311B2

(12) United States Patent
Theisen et al.

(10) Patent No.: US 12,741,311 B2
(45) Date of Patent: Sep. 22, 2026

(54) PROCESS FOR IN-LINE MECHANICALLY SCRIBING OF AMORPHOUS FOIL FOR MAGNETIC DOMAIN ALIGNMENT AND CORE LOSS REDUCTION

(71) Applicant: Metglas, Inc., Conway, SC (US)

(72) Inventors: Eric Alan Theisen, Myrtle Beach, SC (US); Donald E Granger, Jr., Conway, SC (US); Thomas Joseph Hastie, Myrtle Beach, SC (US); Donald Robert Reed, Jr., Galivants Ferry, SC (US)

(73) Assignee: Metglas, Inc., Conway, SC (US)

( * ) Notice: Subject to any disclaimer, the term of this patent is extended or adjusted under 35 U.S.C. 154(b) by 172 days.

(21) Appl. No.: 18/668,352

(22) Filed: May 20, 2024

(65) Prior Publication Data

US 2024/0375173 A1 Nov. 14, 2024

Related U.S. Application Data

(62) Division of application No. 17/033,301, filed on Sep. 25, 2020, now Pat. No. 12,030,115.

(51) Int. Cl.
*B22D 11/114* (2006.01)
*B22D 11/00* (2006.01)
(Continued)

(52) U.S. Cl.
CPC .......... *B22D 11/114* (2013.01); *B22D 11/001* (2013.01); *B22D 11/0611* (2013.01);
(Continued)

(58) Field of Classification Search
CPC .............. B22D 11/001; B22D 11/0611; B22D 11/0642; B22D 11/0651; B22D 11/114;
(Continued)

(56) References Cited

U.S. PATENT DOCUMENTS 4,331,739 A 5/1982 Narasimhan
4,685,980 A 8/1987 Sato et al.
(Continued)

FOREIGN PATENT DOCUMENTS

| | | | |
|---|---|---|---|
| CN | 101351571 | A | 1/2009 |
| DE | 11 2012 000 399 | T5 | 10/2013 |
| TW | 200737237 | A | 10/2007 |

OTHER PUBLICATIONS

Chinese-language Office Action issued in Chinese Application No. 202180065367.X dated May 29, 2025 with English translation (19 pages).

(Continued)

*Primary Examiner* — Lawrence D Ferguson
(74) *Attorney, Agent, or Firm* — Crowell & Moring LLP

(57) ABSTRACT

The invention relates to the reduction of core losses in soft magnetic applications utilizing amorphous foil as the core material. Amorphous foil is known to have lower losses when compared to crystalline silicon steel laminations. It is found that a reduction of 10-40% of losses can be achieved over the current state of the art amorphous material by mechanical scribing of the surface of the soft magnetic laminations comprising the wound core in power conditioning devices such as a transformer. The scribing process introduces control of the magnetic domains causing ease of magnetic flux reversal.

15 Claims, 9 Drawing Sheets

TOP VIEW

SIDE VIEW

(51) Int. Cl.
*B22D 11/06* (2006.01)
*H01F 1/147* (2006.01)
*H01F 1/153* (2006.01)

(52) U.S. Cl.
CPC ...... *B22D 11/0642* (2013.01); *B22D 11/0651* (2013.01); *H01F 1/14775* (2013.01); *H01F 1/15341* (2013.01)

(58) Field of Classification Search
CPC ............. H01F 1/14775; H01F 1/15308; H01F 1/15341
See application file for complete search history.

(56) References Cited

U.S. PATENT DOCUMENTS

| | | | |
|---|---|---|---|
| 4,724,015 | A | 2/1988 | Sato et al. |
| 4,915,750 | A | 4/1990 | Salsgiver et al. |
| 5,013,373 | A | 5/1991 | Block |
| 5,230,381 | A | 7/1993 | Nara et al. |
| 9,290,831 | B2 | 3/2016 | Yoshizawa et al. |
| 10,468,182 | B2 | 11/2019 | Yoshizawa et al. |
| 2003/0121566 | A1 | 7/2003 | Komatsubara et al. |
| 2006/0000524 | A1 | 1/2006 | Ogawa et al. |
| 2007/0175545 | A1 | 8/2007 | Urata et al. |
| 2009/0065100 | A1 | 3/2009 | Yoshizawa et al. |
| 2010/0180746 | A1 | 7/2010 | Shenderovich et al. |
| 2013/0037233 | A1* | 2/2013 | Sato ........................ C22C 45/02 164/463 |
| 2013/0314198 | A1 | 11/2013 | Yoshizawa et al. |
| 2014/0283957 | A1 | 9/2014 | Zhou et al. |
| 2017/0178805 | A1* | 6/2017 | Yoshizawa ......... B22D 11/0614 |
| 2018/0369902 | A1 | 12/2018 | Sunakawa |

OTHER PUBLICATIONS

Chinese-language Office Action issued in Taiwanese Application No. 110132107 dated Jul. 7, 2025 with English translation (26 pages).
International Search Report (PCT/ISA/210) issued in PCT Application No. PCT/US2021/048191 dated Feb. 7, 2022 with English translation (five (5) pages).
Written Opinion (PCT/ISA/237) issued in PCT Application No. PCT/US2021/048191 dated Feb. 7, 2022 (five (5) pages).
Theisen et al. 'An overview of planar flow casting of thin metallic glasses and its relation to slot coating of liquid films'. J Coat Technol Res Jul. 12, 2021. https://doi.org/10.1007/s11998-021-00503-y (45 pages).
International Preliminary Report on Patentability (PCT/IB/338 & PCT/IB/373), including Written Opinion (PCT/ISA/237) issued in PCT Application No. PCT/US2021/048191 dated Apr. 6, 2023 (seven (7) pages).
German-language Office Action issued in German Application No. 11 2021 005 060.5 dated May 15, 2026 with English translation (10 pages).

* cited by examiner

PROCESS FOR IN-LINE MECHANICALLY SCRIBING OF AMORPHOUS FOIL FOR MAGNETIC DOMAIN ALIGNMENT AND CORE LOSS REDUCTION

CROSS-REFERENCE TO RELATED APPLICATIONS

This application is a divisional application of application Ser. No. 17/033,301, filed Sep. 25, 2020, the entire disclosure of which is herein expressly incorporated by reference.

OBJECT OF THE INVENTION

The object of the invention is to reduce core losses in soft magnetic amorphous materials by applying mechanical scribing in-line during the processing of amorphous laminations. The amorphous laminations can be formed into wound core shapes that are utilized in many power conditioning devices and the primary application is for loss reduction in high efficiency distribution transformers.

BACKGROUND OF THE INVENTION

Domain refinement is a common technique used to reduce the core loss of conventional Si-steel laminations, and the mechanism has been well documented. Pinning locations of the magnetic domains ease reversal, and are applied to the laminations in the direction perpendicular to the casting direction. This can be done through many processes in conventional Si-steel laminations.

For instance, U.S. Pat. No. 4,685,980, the contents of which are incorporated by reference in their entirety, teaches a method of applying pinning locations to the Si-steel laminations through laser treatment of the ribbon surface. Laser scribing is a common method of core loss reduction and is taught through multiple patents. This generally involves using laser heating to locally recrystallize Si-steel laminations. U.S. Patent Publication No. 2003/0121566, the contents of which are incorporated by reference in their entirety, uses mechanical contact methods that include introducing strain in the ribbon through lateral grooves applied to the lamination either during the rolling stages of production or afterwards in a separate processing step. These grooves then help to orient the magnetic domains during crystal growth through heat treating stages. U.S. Pat. No. 5,013,373, the contents of which are incorporated by reference in their entirety, uses a chemical etching process to introduce mechanical grooves into Si-steel laminations.

Production of amorphous laminations is different than that of Si-steel as amorphous foil requires relatively high cooling rates to suppress crystallization. These high cooling rates limit the thickness of the laminations to less than ~100 microns and more often to 15-30 microns in thickness. U.S. Pat. No. 4,331,739, the contents of which are incorporated by reference in their entirety, teaches a planar-flow melt spinning (PFMS) process, which is the currently preferred method to produce amorphous foil. PFMS commonly occurs at casting speeds of 15-45 m/s, where the foil is cast and synchronously wound, making it very difficult to achieve any type of scribing in-line during production.

Laser scribing of amorphous laminations has been described in U.S. Pat. Nos. 4,915,750; 4,724,015; and 9,290,831, the contents of each of which are incorporated by reference in their entirety, where the laser pattern is applied after the initial production step. Laser scribing requires the laminations to be individually processed, and the throughput for nominally 25 microns thick amorphous lamination material is lower than Si-steel laminations which can be 10-50 times thicker than amorphous foil. The additional cost associated with processing thin laminations is one of the main reasons that laser scribing has not been widely adopted for amorphous material. Mechanical scribing of amorphous laminations has also not been widely commercialized as the additional processing costs results in the material being prohibitively expensive.

In-line methods for scribing amorphous laminations are challenging due to the processing speeds being typically in the range of 20 to 30 m/s. U.S. Patent No. 10,468,182, the contents of which are incorporated by reference in their entirety, discusses methods to introduce mechanical scribing during processing that utilize either template patterns on the casting substrate surface through scratching the substrate with a wire brush during processing or introducing a wave-like undulation in the ribbon surface by controlling the temperature distribution in the melt nozzle.

SUMMARY OF THE INVENTION

The scribing of the present invention can be achieved in amorphous material in-line during the production of the foil through control of the capillary vibrations of the molten metal puddle feeding material onto the quenching substrate resulting in a cast-in mechanical pattern in the amorphous lamination. This pattern refines the magnetic domains and reduces core losses. The pattern in the foil is a localized reduction in thickness that is captured during the capillary vibration. Under controlled conditions this pattern covers the width direction of the foil completely and has a uniform spacing.

The casting conditions that allow for production of amorphous foil have fundamental stability limits. The basics of the PFMS process are that molten metal must flow onto a rotating chill wheel substrate to rapidly quench into a continuous foil. The linear wheel speed, the applied pressure and metallo-static pressure applied to the molten metal and the gap spacing between the nozzle and the wheel are the primary control parameters for the PFMS process. Wheel speeds that are too slow cause the ribbon thickness to be too high to form an amorphous ribbon and wheel speeds that are too fast impede solidification and prevent a fully quenched foil from being formed. Applied pressures to the molten metal flow that are too high cause the process to overflow and fail to form ribbon. Similarly, applied pressures that are too low do not feed enough molten metal to form a complete ribbon. The gap spacing between the nozzle that feeds the molten metal and the chill wheel is also an important control parameter as the gap provides hydrodynamic resistance to the molten metal flow and allows the flow to form a stable sheet in the width direction. A gap spacing too large does not effectively restrict the flow and a gap spacing too small restricts the flow to the point that the metal freezes in the nozzle slot rather than flowing onto the casting wheel. The process can operate within these fundamental stability limits. However, it has been determined that under select process conditions a capillary vibration is induced in the molten metal and controlled at a specific frequency to the point that a uniform scribed pattern is formed in the amorphous lamination.

BRIEF DESCRIPTION OF THE DRAWINGS

The invention will be more fully understood and further advantages will become apparent when reference is made to the following detailed description of the embodiments and the accompanying drawing in which:

FIG. 6A illustrates an example of a contoured nozzle and an example of a flat bottom (non-contoured) nozzle; FIG. 6B illustrates an example of a non-contoured nozzle; and FIG. 6C illustrates an example of a contoured nozzle that matches the thermal deformation of the casting wheel to maintain a uniform gap height spacing.

FIG. 8A shows the top view and FIG. 8B shows the side view.

DETAILED DESCRIPTION OF THE EMBODIMENTS

As defined herein, a "magnetic domain" is a region in which the magnetic fields of atoms are grouped together and aligned. "Domain refinement" refers to techniques that reduce the core loss of the lamination materials. The term "applied pressure" used here refers to the combination of metallo-static head and any additional gas pressure applied in the crucible. "Free side" of the foil refers to the side that is not in contact with the chill wheel substrate during processing. Unless otherwise stated herein, the description of the properties of the scribed pattern on the foil, including the wavelength, depth, width, etc., refers to the properties observed on the free side of the foil. "Frequency scaling" used herein refers to the resonant frequency at which the molten metal puddle is most susceptible to vibrations. "Scribing" includes techniques used to create small distortions on surface of the lamination materials that result in domain refinement. As described above, PFMS is a rapid solidification process used in the manufacture of thin, metallic ribbon, and foil. "Gap height" is the spacing between the nozzle and the chill wheel surface where the molten metal puddle forms during processing. As used herein, "capillary vibration" refers to the vibration of the molten metal puddle caused by capillary forces during the PFMS process.

Figure 1:
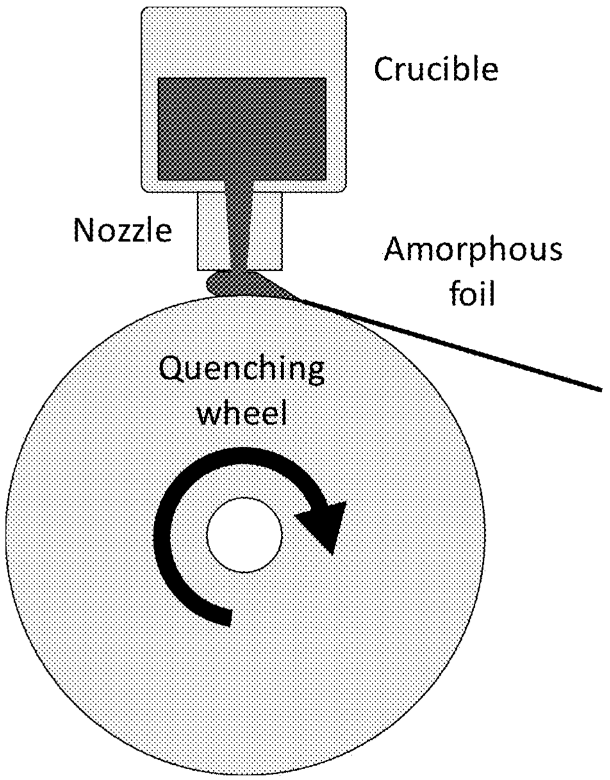
PRIOR ART FIG. 1
FIG. 1 illustrates a schematic of the PFMS process.

In a preferred embodiment, a controlled capillary oscillation of the molten metal puddle during the PFMS process is disclosed. FIG. 1 illustrates features where molten metal is fed from a crucible through a nozzle onto a rotating quench wheel which produces a continuous amorphous or rapidly solidified foil. Important control parameters are the applied pressure in the crucible, the nozzle gap spacing, the internal nozzle geometry, and the linear speed of the wheel. The process may be operated in a batch mode by applying an inert gas pressure in the crucible to account for the decrease in the metallo-static pressure during the cast or it may be operated in a continuous mode by maintaining the molten metal level in the crucible through an additional feeding method. The applied pressure is the combination of metallo-static head and any additional gas pressure applied in the crucible.

Figure 2:
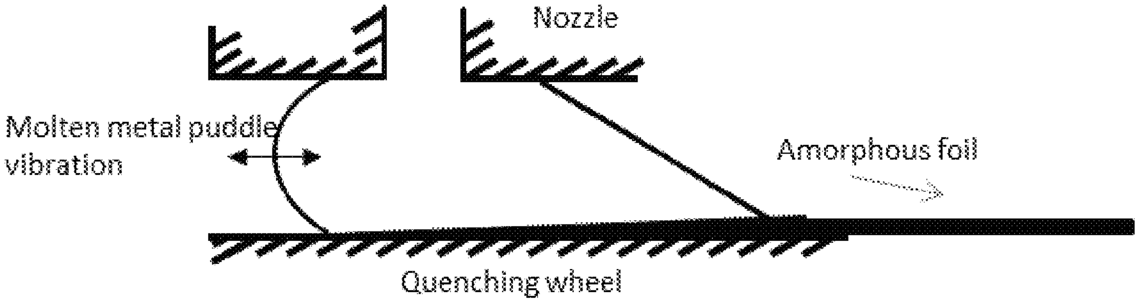
FIG. 2 illustrates the contacting zone where a molten metal puddle forms between the quenching substrate and the nozzle.

A close-up schematic of the contact zone between the nozzle and the wheel is shown in FIG. 2. The gap spacing between the nozzle and the quench wheel, or gap height, is small enough that the gap restricts the molten metal flow rate. The flow of molten metal depends on the applied pressure and the gap height. The combination of gap height, applied pressure, and wheel speed are important for the process stability. There is a wide range of process conditions that may produce amorphous foil. However, within these broad conditions that define the process stability limits it was determined that there are a set of operating parameters that cause the molten metal puddle to freely vibrate at a natural resonant frequency. This vibration frequency is represented by $$f \sim (\sigma/\rho * G^3)^{1/2},$$

where $\rho$ is the density of the molten metal, G is the gap height and $\sigma$ is the molten metal surface tension. Physically this is the ratio of inertial to capillary forces within the puddle. Viscous forces are typically low in molten metals; thus, there is little vibrational dampening and vibrations can freely resonate.

Figure 3:
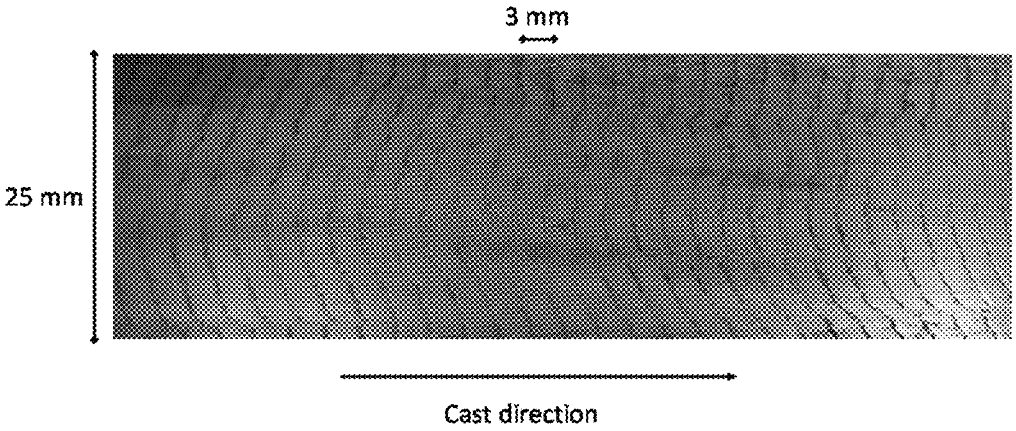
FIG. 3 illustrates an optical image of the amorphous ribbon with the mechanically scribed pattern.
Figure 4A:
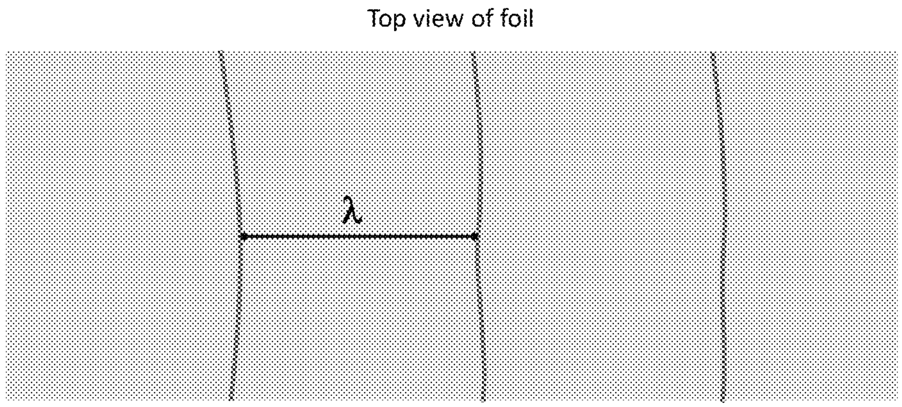
FIG. 4A illustrates the visual pattern observed in the mechanically scribed ribbon.
Figure 4B:
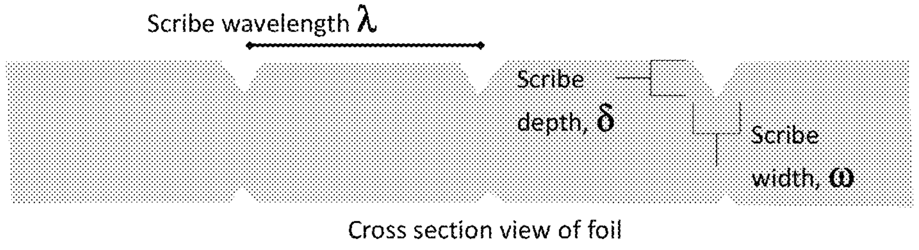
FIG. 4B illustrates the cross section view of the ribbon indicating the localized thickness reduction in the scribed locations.
Figure 4C:
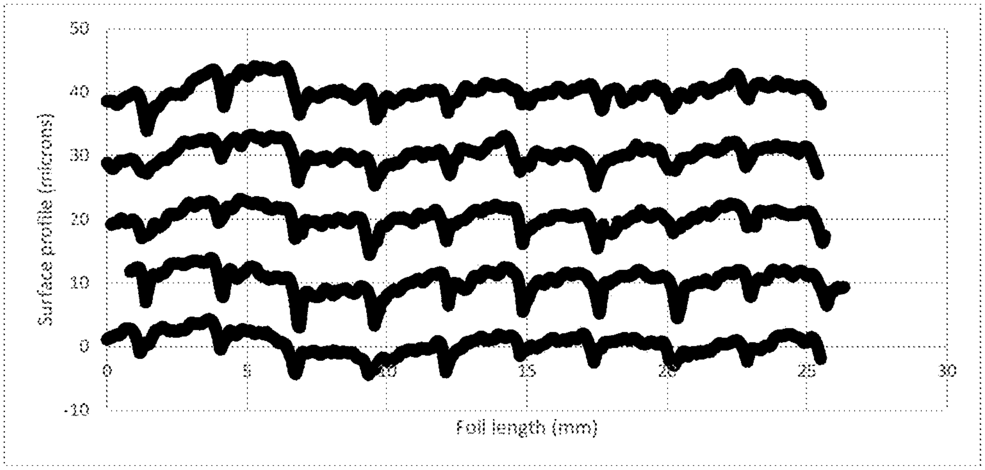
FIG. 4C illustrates profilometer measurements on the surface of the scribed foil.

A feature of this vibrational frequency scaling is the nonlinearity of the gap height, which implies that controlling the gap height is important. Under optimum processing conditions the puddle vibration freely oscillates and a mechanical pattern gets captured for each period of the vibration in the amorphous foil during processing. FIG. 3 illustrates an image of the free side of the amorphous foil with the puddle vibration captured. FIG. 4A illustrates a schematic of the amorphous foil with physical scribed lines present on the surface of the ribbon with each scribed line separated by a wavelength distance $\lambda$. FIG. 4B illustrates a cross section of the foil where the scribed line has a localized reduction in thickness of depth $\delta$ and width $\omega$ and relatively flat sections between the lines. FIG. 4C illustrates a series of surface profilometer measurements across the free side of the amorphous ribbon. Any suitable depth and width of the scribing pattern may be used with the method described herein. In a preferred embodiment of the invention, the depth of the scribing pattern is typically 1-15 microns and the width is typically 50-800 microns. Preferably, the depth of the scribing pattern is in the range of 1 to 5 microns, or more preferably in the range of 1.5 to 3 microns. Preferably, the width of the scribing pattern is in the range of 100 to 500 microns, or more preferably in the range of 200 to 400 microns. The depth of the scribing pattern may be up to 95% of the thickness of the foil being cast. Preferably the depth of the scribing is less than 50% of the foil thickness or more preferably in the range of 10-20% of the foil thickness. The scribing pattern has a localized thickness reduction in the scribing area with a relatively uniform surface between the scribe lines. The spacing between the lines can be characterized as a wavelength, λ. Any suitable wavelength of the scribing pattern may be used with the method described herein. In one embodiment, the wavelength is on the order of 0.5 to 10 mm. In a preferred embodiment, it is on the order of 1 to 5 mm, or more preferably, it is on the order of 2 to 4 mm. The spacing may be defined in a number of ways including i) the length between each line, ii) the number of lines per unit length or iii) the length over a specified number of lines or iv) the total length over a specified number of lines divided by that number to represent an average wavelength. The wavelength data reported here is the length over ten lines divided by ten. These are all equivalent methods of reporting the wavelength between the mechanically scribed lines in the foil. This wavelength can be converted to a frequency by dividing by the linear speed of the quenching wheel as f~λ/U where U is the linear wheel speed. It was determined that by equating the vibrational frequency with the frequency of the foil line spacing frequency there is a predictive relationship for controlling the wavelength of the pattern in the foil as $$\lambda = C * U * \left(\rho * G^3 / \sigma\right)^{1/2}.$$

In one embodiment, under the experimental conditions described herein, C is a geometric constant related to the resonant vibration mode that is experimentally found to be ~0.5. The method described herein may be applied for PFMS machining operations with any suitable alloys and any suitable casting temperatures.

Figure 6A:
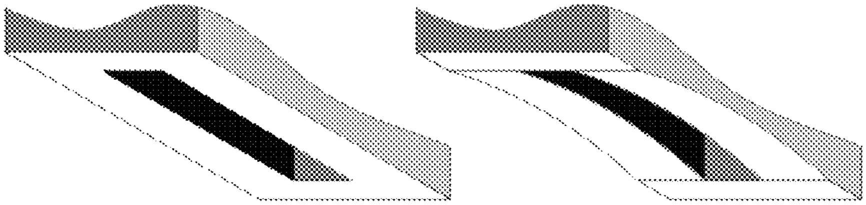
FIG. 6A to 6C are schematics of the nozzle.
Figure 6B:
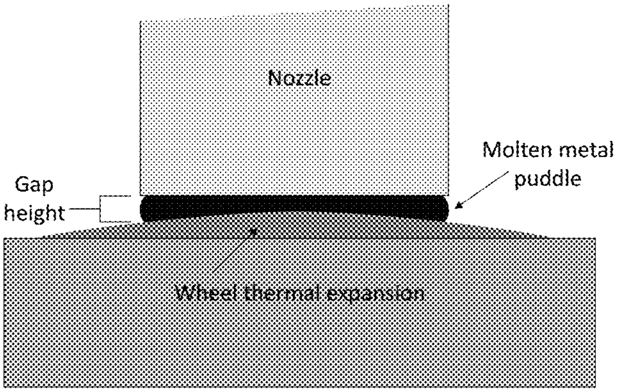

Thermal expansion of the quench wheel may occur during casting due to the high heat flow rates through the PFMS process. Variables such as the quench wheel thickness, the quench wheel internal cooling design, the quench wheel thermal conductivity, the linear casting speed and many others may impact the amount of thermal expansion that occurs. It was determined that the expansion of the casting wheel is typically symmetric across the width of the foil with most expansion occurring in the center of the rim as shown in FIG. 6. The thermal expansion of the wheel causes the gap height to vary spatially in the width direction of the foil. This, in turn, causes the resonant vibrational frequency of the puddle to vary in the same manner. The scaling of the scribed wavelength, 2, therefore also changes in the width direction. The transient period from start up to steady state for the PFMS process may produce some foil that features uniform and full scribing coverage during the short time scale where the thermal expansion effects can be neglected. Thermal expansions are known to occur during PFMS processing, but the variations in the width direction of the chill wheel and the impact it has on the gap height and capillary vibration had not previously been reported. It was determined that in a continuous production mode, or in a batch production mode after a steady-state is reached, it is not possible to maintain a consistent scribing pattern the covers the entire width of the foil without compensating for the gap variation in the width direction. In one embodiment, the capillary vibrations are controlled such that the scribed pattern covers more than 50% of the amorphous foil surface, from edge to edge of the ribbon. Preferably, they cover more than 75% of the amorphous foil surface or, more preferably, they cover more than 90% of the amorphous foil surface, or, even more preferably, they cover 100% of the amorphous foil surface. In other embodiments, the coverage is at least 25%, 30%, 35%, 40%, 45%, 50%, 55%, 60%, 65%, 70%, 75%, 80%, 85%, 90%, 95%, 96%, 97%, 98%, 99%, or 100%. Preferably, the coverage of the scribed pattern on the ribbon is consistent throughout the casting process. In other words, the scribed pattern preferably covers 50% or more of the amorphous foil surface from edge to edge of the ribbon and from the head to the tail of the spool.

Figure 6C:
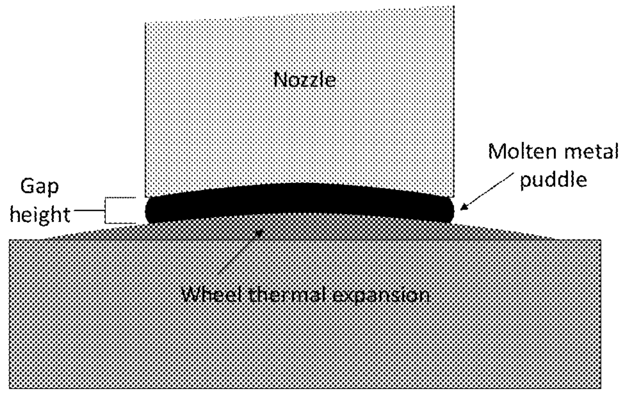

A solution to the thermal expansion is to modify the nozzle gap height in the width direction of the foil as shown in FIG. 6. A contour may be applied to the width direction of the ceramic nozzle to accommodate the wheel expansion. Any suitable contour may be applied to the ceramic nozzle such that it accommodates and matches the wheel expansion. In one embodiment, the wheel expansion is closely matched by machining an arc segment, specifically, a shallow circular arch with a height of 10-500 microns and a length equal to or slightly less than the length of the nozzle slot. The arc machined into the nozzle then adds to the gap spacing across the width of the nozzle. In a preferred embodiment, the arc segment has a height of 30 to 100 microns. The radius of the arc ranges between 5 and 1000 meters. In a preferred embodiment, the radius of the arc ranges between 50 and 100 meters. The radius of the arc depends on the total width of the nozzle where a nozzle slot width of 100 mm requires an arc of preferably 10 meters and a nozzle slot width of 250 mm requires an 800 meters arc. The choice of nozzle width depends on the width of the ribbon being cast, and, thus, the radius of the arc will also depend on the width of the ribbon being cast. In most cases, this radius may be accurately simulated by programming a small number of linear movements with beginning and end points on or near the arc. For example, the radius may be accurately simulated by programming 10 linear movements. A surface grinder with electronic axis positioning is used to apply the contour. In a preferred embodiment, the machining tolerances of the contoured nozzle are within 50 microns of the desired pattern. In a more preferred embodiment, the machining tolerances of the contoured nozzle are within 25 microns of the desired pattern, or more preferably, they are within 10 microns of the desired pattern. The arc along the width of the nozzle allows the gap spacing to be maintained across the length of the slot to within 25 microns once the nozzle and wheel have achieved stable operating temperatures, as illustrated in FIG. 6C. In a preferred embodiment, the gap spacing is maintained across the length of the slot to within 50 microns, or more preferably, within 25 microns. This allows a more consistent vibrational frequency of the molten metal puddle across the width of the ribbon. However, this exact form of thermal expansion may not always be the case and an iterative process can be used to estimate the wheel expansion shape, then apply a contour to the nozzle, test it in the PFMS process and modify the shape of the contour based on the appearance of the ribbon scribed pattern. While different PFMS machines may thermally expand differently based on internal cooling methods, wheel materials, casting speeds and others, the method described herein may be applied to any PFMS machine. For example, this process could include modifying the shape of the nozzle into a something other than an arc, such as flattened arc, a saw-toothed step change in the pattern, or other shapes that mirror the wheel expansion shape. In one embodiment, the amorphous foil has a scribed pattern with a wavelength of 0.5 to 10 mm with casting speeds of 5 to 50 m/s corresponding to capillary vibration frequencies of 2.5 to 30 KHz.

Figure 7A:
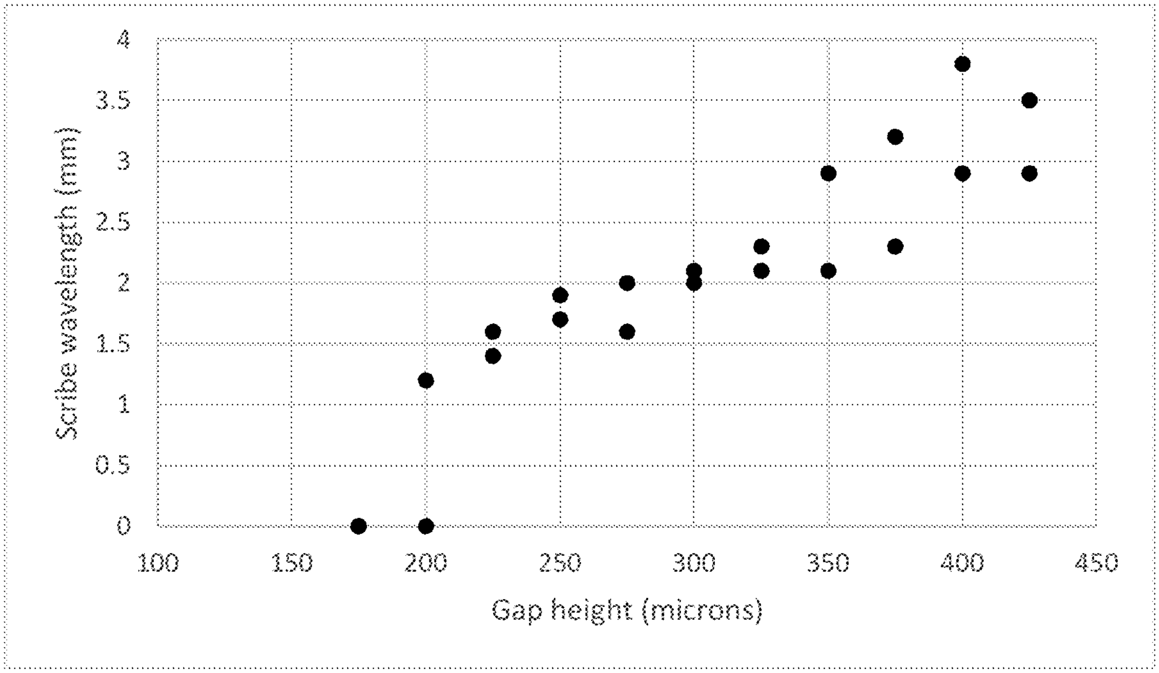
FIG. 7A illustrates the scribing wavelength as a function of the gap height.

Maintaining a uniform gap height across the width of the ribbon allows for the control of the capillary vibration to scribe a wavelength that is uniform across the ribbon. FIG. 7A illustrates how the scribe wavelength changes as the gap height varies. Data shown in FIG. 7 correspond to a wheel speed of 18 m/s and an applied pressure of nominally 10 kPa. The process described herein may generally be used with any suitable wheel speeds. In one embodiment, the process may be used with wheel speeds of 5-50 m/s. Preferably, the process can be used with wheel speeds of 15-25 m/s, or more preferably, with wheel speeds of 18-23 m/s. As the gap height is varied the applied pressure is adjusted to keep the ribbon thickness constant at 25 microns. The process described herein may be used with any suitable applied pressure. In one embodiment, the process may be used with applied pressure of 2-20 kPa. In a preferred embodiment, the applied pressure is in the range of 4-14 kPa, and more preferably, the applied pressure in the range of 5-10 kPa. Based on the conditions used to arrive at the measurements in FIG. 7A, which is one embodiment of the invention, low gap heights, typically below 150 microns, do not typically exhibit the scribe pattern. The amorphous ribbon tends to have a very smooth, mirror-like, surface finish under this low gap condition. In the embodiment illustrated in FIG. 7A, gap heights between 200-400 microns show the scribe pattern measurements in FIG. 7A. Likewise, in the embodiment illustrated in FIG. 7A, gap heights greater than 350 microns show scribing patterns that are less regular in wavelengths, less clearly defined and harder to measure. In one embodiment, the core loss begins to increase as the gap height is further increased and the scribing wavelength becomes longer and less consistent in appearance. The ideal gap heights for applying the scribing pattern may be determined through modifications to the process conditions (e.g., applied pressure, wheel speed, alloy formulation). Depending on the casting process conditions utilized, the ideal gap height to apply the scribing pattern to the ribbon may range from 75 microns to 1 mm, preferably from 75 to 400 microns, more preferably 150 to 300 microns, and even more preferably from 200 to 230 microns.

A broad range of soft magnetic compositions may utilize this scribing method. Alloys generally follow the formula $Fe_{100-v-w-x-y-z}Si_vB_wP_xC_yM_z$ in atomic percentages, where Si, B, P and C are nonmetals included in the alloy to help form the amorphous structure, and M can preferably be some combination of Co, Nb, Cu, Mo, Cr, Ni or any transition metals belonging to Groups IV to XI, in addition to unavoidable impurities. One embodiment includes an alloy where v=0-15.2 atomic percent, w=0-20.3 atomic percent, x=0-15.9 atomic percent, y=0-2 atomic percent, z=0-66.8 atomic percent and $15<v+w+x+y<30$. In other embodiments, the alloy for producing the foil consists essentially of $Fe_{100-v-w-x-y-z}Si_vB_wP_xC_yM_z$ in atomic percentages, wherein Fe is from 78-84, Si is from 0-10, B is from 11-18, and C is from 0-0.5. Table 1 lists representative examples of chemistries that exhibit the scribing pattern with wavelength λ in the amorphous foil and the associated induction level, B, when driven under an applied field of 800 A/m.

TABLE 1

Soft magnetic amorphous alloy compositions that show mechanical scribing pattern along with the $B_{800}$ value and scribed wavelength.

| | Atomic Percentage | | | | | | | | | | | $B_{800}$ | λ |
|---|---|---|---|---|---|---|---|---|---|---|---|---|---|
| Alloy # | Fe | B | Si | Co | Nb | Cu | P | Mo | Cr | C | Ni | (T) | (mm) |
| 1 | 78.1 | 17.7 | 4.1 | — | — | — | — | — | — | — | — | 1.57 | 1.4 |
| 2 | 83.5 | 16.1 | 0.3 | — | — | — | — | — | — | — | — | 1.6 | 1.7 |
| 3 | 81.8 | 11.6 | 6.4 | — | — | — | — | — | — | — | — | 1.53 | 1.7 |
| 4 | 83.2 | 13.7 | 3 | — | — | — | — | — | — | — | — | 1.6 | 1.5 |
| 5 | 84.4 | 15.2 | 0.3 | — | — | — | — | — | — | — | — | 1.59 | 1.6 |
| 6 | 79.41 | 20.31 | 0.28 | — | — | — | — | — | — | — | — | 1.64 | 1.4 |
| 7 | 79 | 16.78 | 4.22 | — | — | — | — | — | — | — | — | 1.61 | 1.3 |
| 8 | 79.88 | 11.95 | 8.17 | — | — | — | — | — | — | — | — | 1.6 | 1.5 |
| 9 | 75.9 | 15.92 | 8.18 | — | — | — | — | — | — | — | — | 1.53 | 1.3 |
| 10 | 81.87 | 16.13 | 2 | — | — | — | — | — | — | — | — | 1.63 | 1.5 |
| 11 | 84.05 | 15.72 | 0.23 | — | — | — | — | — | — | — | — | 1.62 | 1.7 |
| 12 | 77.96 | 18.06 | 3.98 | — | — | — | — | — | — | — | — | 1.6 | 1.5 |
| 13 | 80.14 | 17.87 | 1.99 | — | — | — | — | — | — | — | — | 1.64 | 1.5 |
| 14 | 81.59 | 18.14 | 0.27 | — | — | — | — | — | — | — | — | 1.66 | 1.4 |
| 15 | 82.02 | 13.98 | 4 | — | — | — | — | — | — | — | — | 1.62 | 1.4 |
| 16 | 84.21 | 11.88 | 3.91 | — | — | — | — | — | — | — | — | 1.49 | 1.6 |
| 17 | 80.14 | 15.93 | 3.93 | — | — | — | — | — | — | — | — | 1.6 | 1.4 |
| 18 | 73.9 | 6.9 | 15.2 | — | 3 | 1 | — | — | — | — | — | 1.22 | 4.1 |
| 19 | 42.4 | 15.8 | — | — | — | — | — | 3.9 | — | — | 37.9 | 0.9 | 1.9 |
| 20 | 66.1 | 14.8 | 1.1 | 18 | — | — | — | — | — | — | — | 1.8 | 2.4 |
| 21 | 77.1 | 16.1 | 4.8 | — | — | — | — | — | 2 | — | — | 1.45 | 1 |
| 22 | 3.7 | 14.1 | 14.1 | 66.8 | — | — | — | — | — | — | 1.3 | 0.6 | 1.4 |
| 23 | 84.1 | — | — | — | — | — | 15.9 | — | — | — | — | 1.4 | 1.4 |
| 24 | 81 | 10 | 4 | — | — | — | 5 | — | — | — | — | 1.55 | 1.8 |
| 25 | 80.7 | 14.1 | 3.2 | — | — | — | — | — | — | 2 | — | 1.63 | 1.9 |

For example, the scribing pattern may be applied to foil in widths from 10 mm to 1 meter. The width of the foil may be limited by the nozzle and casting wheel dimensions, as well as the ability to apply a contour to the nozzle such that the gap height is held constant where the scribing pattern is uniformly applied. In one embodiment, the method described herein may be used to scribe ribbons in widths ranging from 10 mm to 260 mm, for example, the ribbon may be 10, 20, 30, 40, 50, 60, 70, 80, 90, 100, 110, 120, 130, 140, 150, 160, 170, 180, 190, 200, 210, 220, 230, 240, 250, and 260 mm, and any variation within those widths. The ability to cast ribbons at these widths with the scribed pattern depends on the dimensions of the nozzle and casting wheel and the contour applied to the nozzle such that the gap height is held constant and the scribing pattern is uniformly applied. This scribing pattern may be applied to foils that are 13 to 75 microns thick. In one embodiment, the ribbons are about 13-40 microns thick, more preferably the ribbons are about 13-30 microns thick. In one embodiment, λ is observed to vary between 1 to 5 mm depending on the alloy and processing conditions. The scribing pattern may be seen to cover anywhere from 10 to 100% of the surface of the foil. In one embodiment, the scribed pattern covers from 10 to 100% of the ribbon including both edge to edge and head to tail on the spool of the ribbon. The induction levels of the foil may vary between 0.6 to 1.8 T depending on the alloy chemistry.

Figures 5A, 5B, 5C:
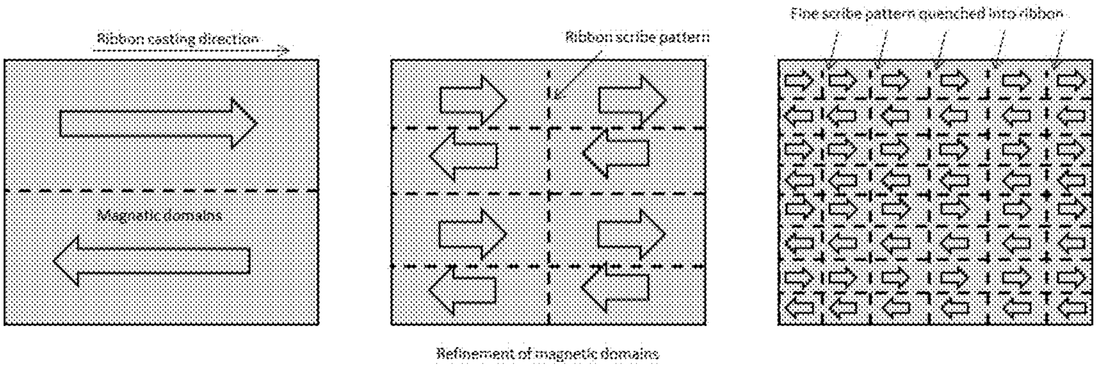
FIG. 5A to 5C are schematics of the magnetic domains in the ribbon and how adding the scribing reduces the magnetic domain widths.

In most cases this scribed pattern in the foil is not a desirable feature and prior methods sought to avoid casting alloys with any patterns. However, it was determined that there is an unexpected benefit that this pattern has on the magnetic performance of the foil where the losses are reduced. The capillary vibration method described herein to apply the scribing pattern in the foil allows for the magnetic domain control to be applied in-line during the foil production in a single step. FIG. 5A-5C are schematics of the magnetic domains of the amorphous ribbon. The mechanically scribed pattern refines the domains and reduces the domain widths causing the ease of magnetic flux reversal to be enhanced and the core losses to be reduced.

The loss reduction found in the scribed foil depends in part on the final application. Typically, the amorphous foil properties are reported in the single strip configuration. Each coil of foil is sampled and tested in a flat single strip configuration according to the test methods defined in ASTM International Amorphous Testing standards. The foil is used primarily in either a wound toroid configuration or a laced distribution transformer core application. Each of these has a building factor or destruction factor that adds to the loss when converting from a single sheet to a core configuration. Table 2 illustrates embodiments of the invention including typical sample weights and measured losses of the three configurations for nominal foil and scribed foil of composition $Fe_{81}B_{14.7}Si_4C_{0.3}$. In all cases the scribing condition results in a typical loss reduction of around 30%. The methods described herein may allow for scribing conditions that show loss reduction ranging from 10 to 40%, preferably the conditions result in a loss reduction ranging from 20 to 40%. The single sheet test may include a sample of foil that weighs on a few grams. The toroidal configuration may include a foil that is wound upon itself, most commonly in a cylindrical shape, and may weigh anywhere from a few tens of grams to a few kgs. The distribution transformer cores are much larger in mass and may weigh anywhere from a few kgs to over 1000 kgs depending on the transformer size.

TABLE 2

Core loss ranges tested at 1.4 T induction and 60 Hz frequency for nominal amorphous foil and scribed foil showing an average loss reduction percentage.

| | Single Sheet | Wound Toroid | Transformer Core |
|---|---|---|---|
| Sample Weight (kg) | 0.005-0.05 | 0.05-1 | 10-1000 |
| Nominal Condition (W/kg) | 0.1-0.15 | 0.25-0.4 | 0.22-0.28 |
| Scribing Condition (W/kg) | 0.07-0.1 | 0.18-0.25 | 0.16-0.2 |
| Percent loss reduction | 32% | 34% | 28% |

Figure 7B:
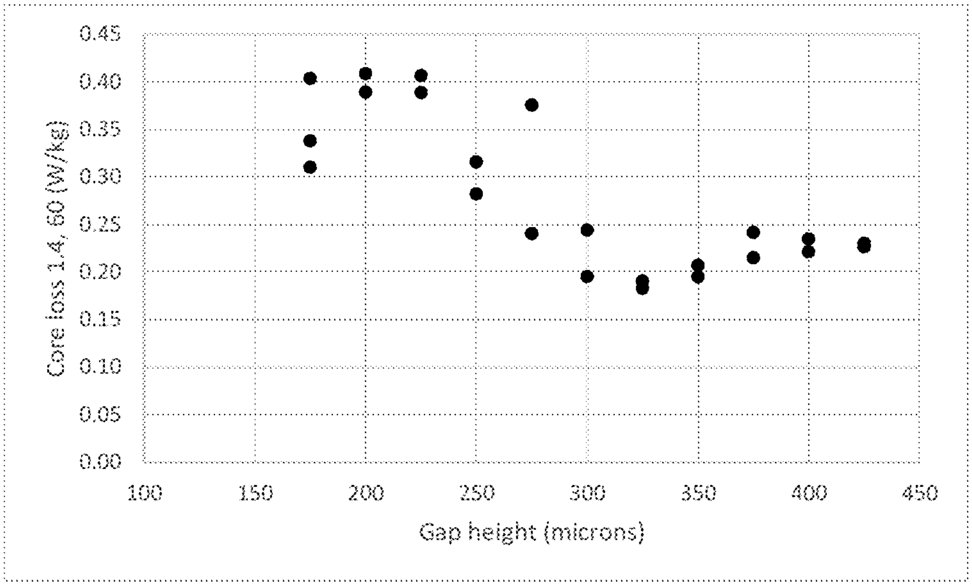
FIG. 7B illustrates the core loss as a function of the gap height.
Figure 7C:
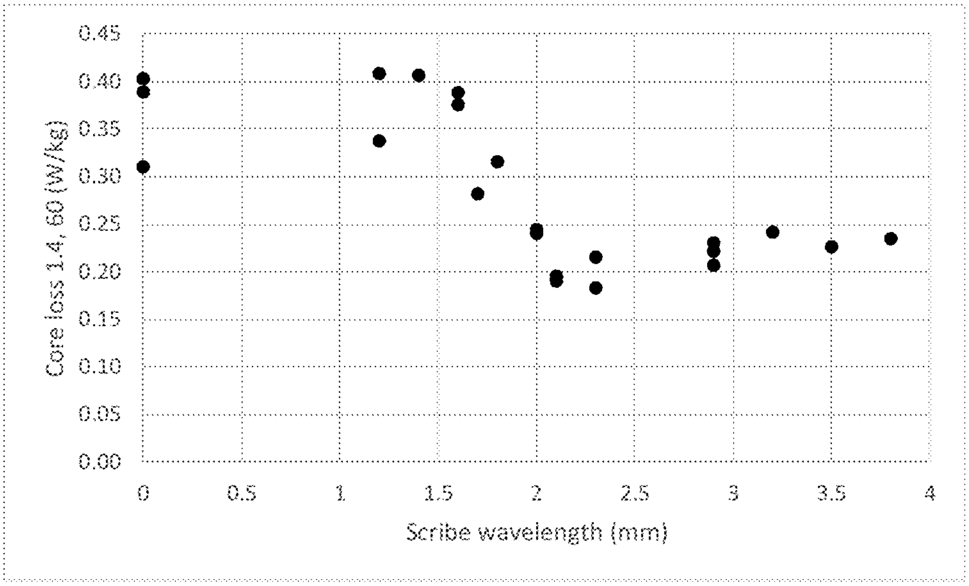
FIG. 7C illustrates the core loss as a function of scribe wavelength.

FIG. 7B illustrates the core loss as a function of the gap height for an embodiment of the invention with a wound toroid of composition $Fe_{81}B_{14.7}Si_4C_{0.3}$. Here, the magnetic properties of the ribbon were measured by winding the ribbon into a 25 mm wide toroidal form with inner diameter of 40 mm, an outer diameter of 43 mm, a core weight of 30 grams and the core was annealed with an applied magnetic field. Here, there is an optimum gap height of 200 to 400 microns that minimizes core losses. FIG. 7C illustrates the core loss as a function of the scribe wavelength and it is seen that optimum scribe wavelength for reducing core loss is between 1.5 to 4 mm in this toroidal core configuration. From this it was determined that the gap height controls the scribing wavelength which in turn then optimizes the magnetic domain refinement.

Table 3 shows a list of embodiments of the invention, including sample castings of 213 mm wide foil of composition $Fe_{81}B_{14.7}Si_4C_{0.3}$ that utilize the scribing method. The core loss and exciting power measurements are taken at 1.4 T, 60 Hz. Here, the single sheet test results are reported under optimum process conditions and the scribing is further characterized in terms of λ, δ and ω as defined in FIG. 4B. These profilometer measurements were done using a Mitutoyo Surface Roughness Tester model SJ-410 on the free surface of the foil. Here, the B80 measurement is the magnetic induction at an applied field of 80 A/m and the lamination factor is a measure of stacking density that ranges between 0.875 and 0.914. The reported scribe dimensions of λ=2 mm, δ=3 microns and ω=300 microns show the best loss reduction in the single sheet configuration.

TABLE 3

Single strip test results showing the physical and magnetic properties of optimally scribed foil on the production machine.

| Sample | B80 (T) | Core loss (W/kg) | Exciting power (VA/kg) | Laminatation factor | Foil width (mm) | λ (mm) | δ (micron) | ω (micron) |
|---|---|---|---|---|---|---|---|---|
| 1 | 1.56 | 0.080 | 0.246 | 0.888 | 213 | 2.20 | 2.9 | 260 |
| 2 | 1.55 | 0.083 | 0.245 | 0.875 | 213 | 2.00 | 3.2 | 235 |

TABLE 3-continued

Single strip test results showing the physical and magnetic properties of optimally scribed foil on the production machine.

| Sample | B80 (T) | Core loss (W/kg) | Exciting power (VA/kg) | Laminatation factor | Foil width (mm) | λ (mm) | δ (micron) | ω (micron) |
|---|---|---|---|---|---|---|---|---|
| 3 | 1.57 | 0.077 | 0.212 | 0.892 | 213 | 1.80 | 2.1 | 350 |
| 4 | 1.56 | 0.079 | 0.235 | 0.875 | 213 | 2.00 | 4.6 | 460 |
| 5 | 1.54 | 0.083 | 0.286 | 0.914 | 213 | 2.10 | 3.8 | 215 |
| 5 | 1.55 | 0.083 | 0.267 | 0.890 | 213 | 2.00 | 2.8 | 250 |
| 7 | 1.55 | 0.086 | 0.268 | 0.909 | 213 | 1.90 | 4.7 | 290 |
| 8 | 1.55 | 0.086 | 0.283 | 0.895 | 213 | 2.00 | 2.1 | 300 |
| 9 | 1.55 | 0.086 | 0.300 | 0.898 | 213 | 2.20 | 3.1 | 320 |
| 10 | 1.55 | 0.086 | 0.305 | 0.895 | 213 | 2.00 | 2.8 | 365 |
| Average | 1.55 | 0.083 | 0.265 | 0.893 | 213 | 2.02 | 3.2 | 305 |

In the embodiment shown in Table 3, the amorphous foil core has a reduced core loss of 31% in comparison to the amorphous foil core operating under normal PFMS process conditions when tested at an operation induction level of 1.4 T, at 60 Hz, because the single sheet losses have been reduced from a typical value of 0.125 W/kg to 0.083 W/kg. According to the invention, the controlling of the scribing pattern may affect the core losses by ~25-40% overall.

EXAMPLES

A) Alloy Composition $Fe_{81}B_{14.7}Si_4C_{0.3}$

Example 1—Normal Operating Conditions

Figure 9:
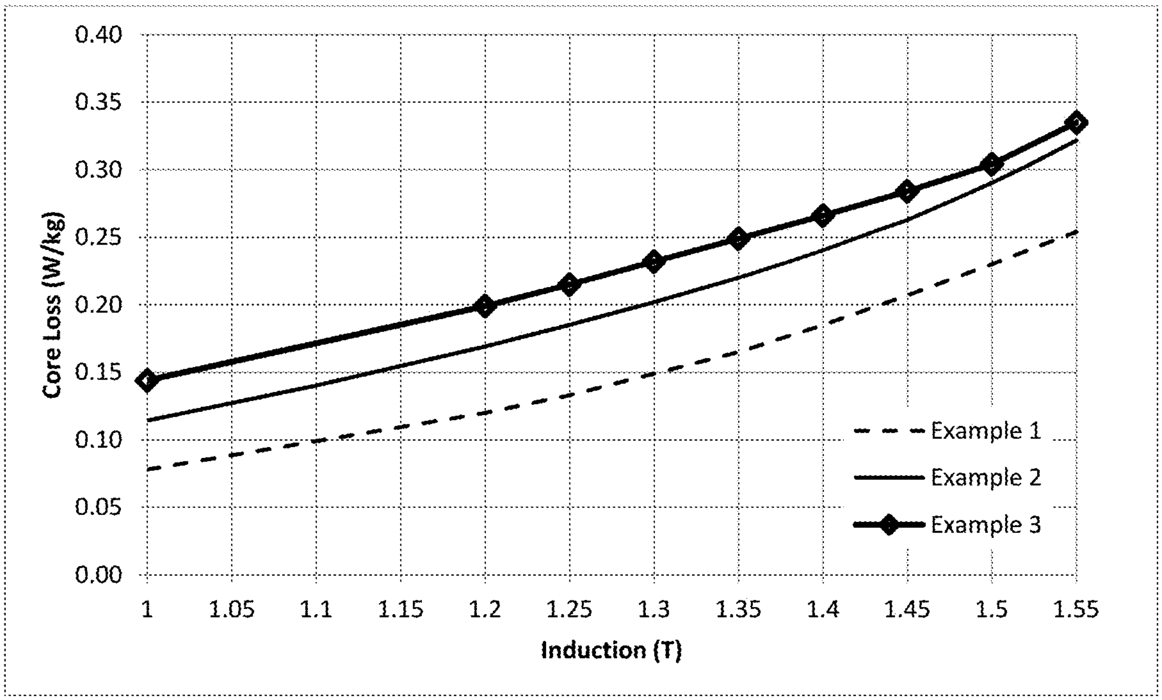
FIG. 9 illustrates the core loss as a function of induction level in an amorphous core of alloy $Fe_{81}B_{14.7}Si_4C_{0.3}$ for lamination material made from typical amorphous foil, optimally scribed foil and minimally scribed foil.

The alloy of $Fe_{81}B_{14.7}Si_4C_{0.3}$, in atomic percentage, is one of the normal chemistries that is commercially produced and multiple finished cores has been formed under normal operating conditions. Table 4 lists the typical process parameter range for important control variables of the process. The nozzle condition for standard production is of a flat bottom, non-contoured type. This results in the scribing pattern being observed when the process conditions align with the conditions in Example 1. However, since the nozzle is not contoured the scribing coverage is rarely in the 75-100% range, the coverage is typically in the 25-50% range. FIG. 9 illustrates the core loss under normal operational conditions compared to the optimum scribing condition of Example 1. The distribution core in Example 1 has ~25% lower core losses than typical material of Example 2. At an induction level of 1.4 T the losses of Example 1 are 0.18 W/kg and the losses of Example 2 are 0.24 W/kg.

Example 2—Optimum Scribing Conditions

Figure 8A:
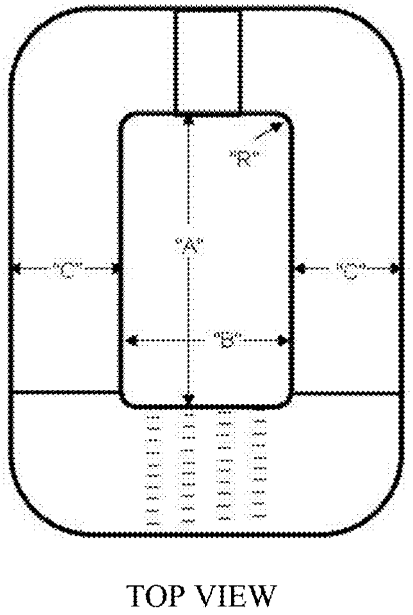
FIG. 8A and 8B illustrate schematics of a laced distribution transformer core that is typical for amorphous transformers.
Figure 8B:
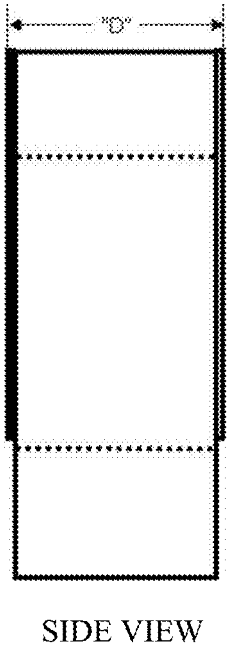

FIG. 8A and 8B illustrate the geometry of a distribution transformer core that is commonly used for amorphous foil. This type of core may be on the order of ~10 to 1000 kgs, but more commonly between 40 and 150 kgs, and is much larger than the toroidal core size shown in Table 2. The final core losses depend on the configuration of the core, so small wound toroidal data does not always correspond to large transformer core results, but the trends will be the same with respect to the scribing results. An alloy of $Fe_{81}B_{14.7}Si_4C_{0.3}$, in atomic percentage, was produced utilizing the in-line scribing method with a nozzle that was contoured to match the wheel profile. This alloy has a saturation induction of 1.63 T. Table 4 lists the typical process parameter range for important control variables of the process. Also listed are the ranges that yield the scribed pattern in the foil. Not all combinations of the process conditions listed in Table 4 successfully yield a stable PFMS process. In general, the capillary pressure set by the gap height must balance the applied pressure causing the molten metal to flow. So, a low gap height causes high capillary pressures that must be balanced by a high applied pressure. As the gap height varies the applied pressure must also vary inversely.

The scribing pattern had an average wavelength of ~2.2 mm and a coverage percentage of between 75-100%. Table 5 lists the geometric conditions of the distribution transformer core, the percentage of scribing coverage and the final core loss. FIG. 9 illustrates the core loss at 60 Hz as a function of induction level. The core loss at 1.4 T, 60 Hz, is shown to be 0.18 W/kg.

TABLE 4

Normal operation parameter ranges for PFMS, ranges to optimize in-line scribing pattern and ranges to minimize the scribing pattern in the foil.

| Process condition | Normal Operation range Example 1 | Optimum Scribing range Example 2 | Scribing free range Example 3 |
|---|---|---|---|
| Gap height | 75-380 microns | 200-230 microns | 75-125 microns |
| Applied pressure | 4-14 kPa | 5.5-7.5 kPa | 9-11 kPa |
| Wheel speed | 20-26 m/s | 21.5-23 m/s | 21.8 m/s |
| Nozzle type | Flat bottom, non-contoured | Contoured | Flat or contoured |

Example 3—Scribing Free Conditions

The alloy of $Fe_{81}B_{14.7}Si_4C_{0.3}$, in atomic percentage, is one of the normal chemistries that is commercially produced and multiple finished cores has been formed under normal operating conditions. Table 4 lists the typical process parameter range for casting foil with almost none of the scribing present. The nozzle condition here may be either a flat bottom (non-contoured) or contoured type. The gap height is on the very low end of the stable operation condition to prevent any scribing from occurring so perhaps the contouring does very little at this low gap level. This results in the ribbon having a near mirror finish. The coverage for this trial is in the 0-25% range. FIG. 9 illustrates the core loss of scribed free range compared to the optimum scribing condition of Example 1. At an induction level of 1.4 T the losses of Example 1 are 0.18 W/kg and the losses of Example 3 are 0.27 W/kg showing an overall reduction of 33%.

FIG. 9 illustrates the core loss at 60 Hz as a function of induction level of the in-line scribing controlled foil from Example 1 compared to normal production material from Example 2 and scribe-free material from Example 3. All of the data in FIG. 9 corresponds to a distribution transformer core configuration shown in FIG. 8 that were formed, annealed and tested under the same standard conditions. U.S. Pat. No. 4,741,096 teaches the method of forming an amorphous distribution transformer core that has been widely adopted by industry. A typical operating induction level for an amorphous transformer of this composition is between 1.35 to 1.45 T. For comparison, at 1.4 T the scribed ribbon of Example 1 has a 60 Hz core loss of 0.18 W/kg, the typical production material of Example 2 has a 60 Hz core loss of 0.24 W/kg and the scribe free material of Example 3 has a 60 Hz core loss of 0.27 W/kg. This demonstrates the controlling of the scribing pattern may affect the core losses by ~25-35% overall.

TABLE 5

Geometry of distribution transformer cores built for magnetic testing.

| Transformer core dimension | A (mm) | B (mm) | C (mm) | D (mm) | Weight (kg) | Scribe coverage | Core loss (W/kg) | Test condition |
|---|---|---|---|---|---|---|---|---|
| Example 1 | 365 | 125 | 50 | 213 | 75.1 | 75-100% | 0.18 | 1.4 T-60 Hz |
| Example 2 | 365 | 125 | 50 | 213 | 75.1 | 25-50% | 0.24 | 1.4 T-60 Hz |
| Example 3 | 365 | 125 | 50 | 216 | 75.1 | 0-25% | 0.27 | 1.4 T-60 Hz |
| Example 4 | 254 | 100 | 75 | 142 | 47.2 | 75-100% | 0.16 | 1.3 T-60 Hz |
| Example 5 | 235 | 110 | 75 | 142 | 63.2 | 25-50% | 0.22 | 1.3 T-60 Hz |

(A, B, C, and D are the dimensions of the core as noted in FIG. 8.)

B) Alloy Composition $Fe_{79}B_{11.6}Si_{9.3}C_{0.1}$

Example 4—Normal Operating Conditions

Figure 10A:
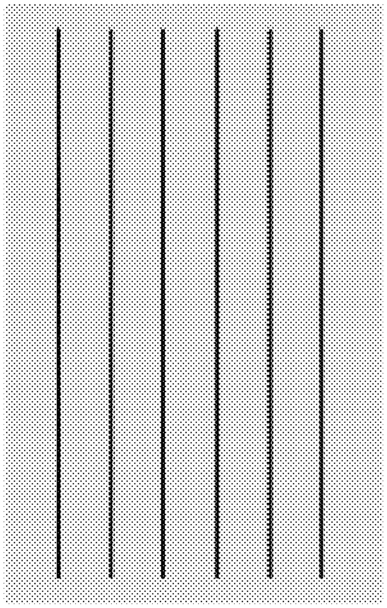
FIG. 10A illustrates a schematic of the scribed pattern covering 75-100% of the foil surface from edge to edge.
Figure 10B:
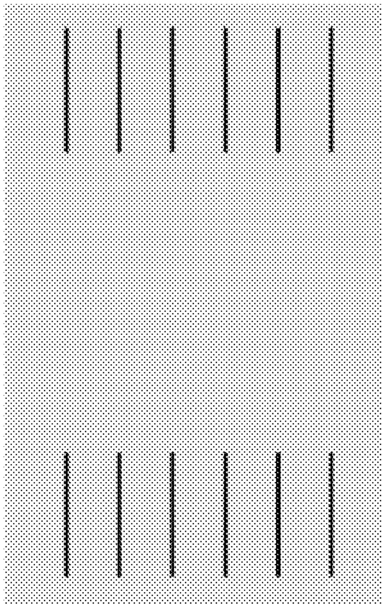
FIG. 10B illustrates coverage of 25-50% of the foil surface from edge to edge.

An alloy of $Fe_{79}B_{11.6}Si_{9.3}C_{0.1}$, in atomic percentage, was produced utilizing used standard operating conditions and a flat bottom nozzle and non-contoured. The casting conditions were not restricted to the optimum level for scribing but allowed to vary within the operational control limits. Here the scribing pattern was present but had a coverage percentage of between 25 to 50% and a core loss of 0.22 W/kg when measured at 1.3 T, 60 Hz. FIG. 10A illustrates a schematic of the surface condition for scribed foil with a coverage of 75 to 100%. FIG. 10B illustrates the typical surface condition for scribed foil that has 25 to 50% coverage.

Figure 11:
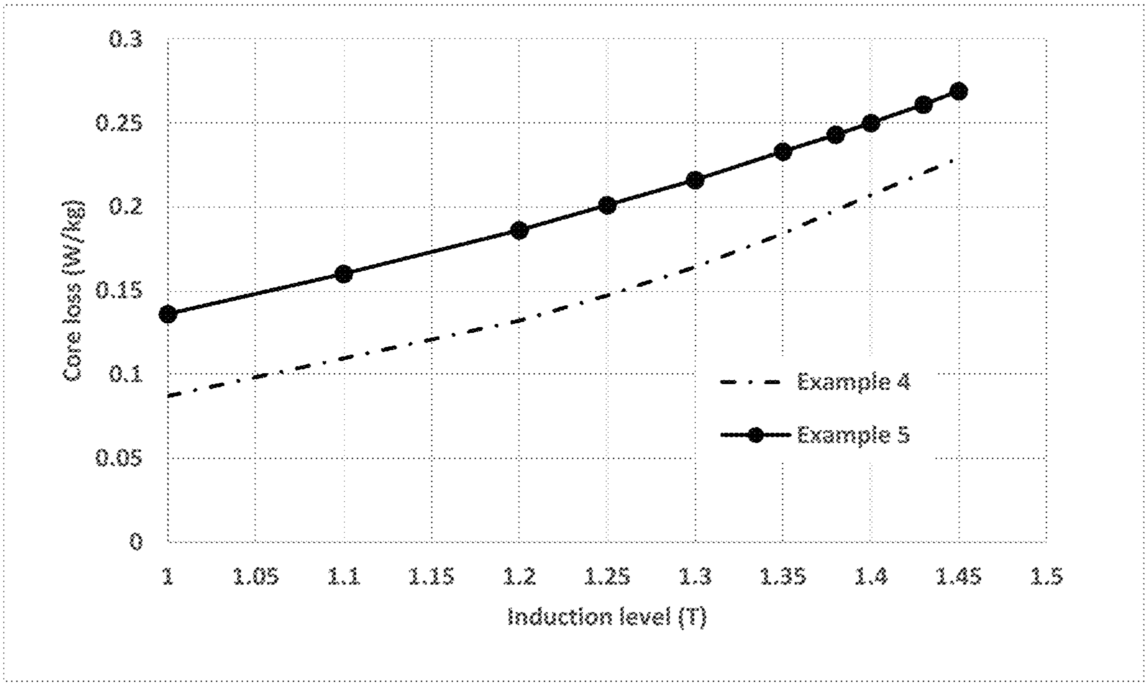
FIG. 11 illustrates the core loss as a function of induction level in an amorphous core of alloy $Fe_{79}B_{11.6}Si_{9.3}C_{0.1}$ for lamination material made from optimally scribed foil and typical amorphous foil.

FIG. 11 illustrates the core loss at 60 Hz as a function of induction level of the in-line scribing controlled foil with 75 to 100% coverage from Example 4 compared to 25 to 50% scribe coverage material from Example 5. All of the data in FIG. 11 corresponds to a distribution core configuration shown in FIG. 8 that were formed, annealed and tested under the same standard conditions. The core loss is reduced by 28% when the scribing coverage is 75 to 100% compared to when the coverage is only 25 to 50%.

Example 5—Optimum Scribing Conditions

An alloy of $Fe_{79}B_{11.6}Si_{9.3}C_{0.1}$, in atomic percentage, was produced utilizing the in-line scribing method with a nozzle that was contoured to match the wheel profile. This alloy has a saturation induction of 1.56 T. The conditions for optimizing the scribing condition from Table 4 were also applied here. Here the scribing pattern had an average wavelength of ~2.5 mm and a coverage percentage of between 75-100%. The operating induction of a transformer with this alloy is lower due to the lower saturation induction of the alloy. Therefore, the losses are evaluated at 1.3 T, 60 Hz, and show a core loss of 0.16 W/kg.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An amorphous foil having a width of 75 to 260 mm and a uniform scribed pattern with a wavelength of 0.5 to 10 mm across the amorphous foil, wherein the scribed pattern is formed by a capillary vibration in a molten metal puddle, the capillary vibration is controlled by a frequency of the capillary vibration, the frequency of the capillary vibration is represented by $f\sim(\sigma/\rho^*G^3)^{1/2}$, where ρ represents a density of a molten metal. G represents a gap height between a nozzle and a chill wheel surface where the molten metal puddle forms during processing, and σ represents a surface tension of the molten metal, and the frequency of the capillary vibration is dependent on the gap height.

2. The amorphous foil of claim 1, wherein the scribed pattern covers more than 50% of a surface of the amorphous foil.

3. The amorphous foil of claim 1, wherein the scribed pattern covers more than 75% of a surface of the amorphous foil.

4. The amorphous foil of claim 1, wherein the scribed pattern covers more than 90% of a surface of the amorphous foil.

5. The amorphous foil of claim 1, wherein a composition of the amorphous foil comprises of $Fe_{100-v-w-x-y-z}Si_vB_wP_xC_yM_z$ in atomic percentages and unavoidable impurities, wherein Si, B, P and C are nonmetals added to help forming an amorphous structure and M is selected from the group consisting of metals from Groups IV to XI, and combinations thereof, wherein v=0-15.2, w=0-20.3, x=0-15.9, y=0-2, z=0-66.8 and 15<v+w+x+y<30.

6. The amorphous foil of claim 5, wherein Mis selected from the group consisting of Co, Nb, Cu, Mo, Cr, Ni and combinations thereof.

7. The amorphous foil of claim 5, wherein the composition of the amorphous foil consists essentially of $Fe_{100-v-w-x-y-z}Si_vB_wP_xC_yM_z$ in atomic percentages, wherein Fe is from 78-84, Si is from 0-10, B is from 11-18, and C is from 0-0.5.

8. The amorphous foil of claim 5, wherein the amorphous foil has a saturation induction of 1.6 to 1.66 T.

9. The amorphous foil of claim 5, wherein the amorphous foil has a saturation induction of 1.4 to 1.6 T.

10. The amorphous foil of claim 1, wherein the amorphous foil is 13 to 75 microns thick.

11. An amorphous core comprising an amorphous foil having a width of 75 to 260 mm and a uniform scribed pattern with a wavelength of 1 to 5 mm across the amorphous foil, wherein the scribed pattern is formed by a capillary vibration in a molten metal puddle, the capillary vibration is controlled by a frequency of the capillary vibration, the frequency of the capillary vibration is represented by $f \sim (\sigma/\rho * G^3)^{1/2}$, where ρ represents a density of a molten metal, G represents a gap height between a nozzle and a chill wheel surface where the molten metal puddle forms during processing, and σ represents a surface tension of the molten metal, and the frequency of the capillary vibration is dependent on the gap height, wherein the amorphous foil is wound into a toroidal core or into a laced distribution transformer core, and wherein the amorphous core has reduced losses of core losses less than 0.2 W/kg when tested at 1.4 T, 60 Hz and less than 0.17 W/kg when tested at 1.3 T, 60 Hz.

12. An amorphous foil having a width of 75 to 260 mm and a uniform scribed pattern with a wavelength of 1 to 5 mm across the amorphous foil, wherein the scribed pattern is formed by a capillary vibration in a molten metal puddle, the capillary vibration is controlled by a frequency of the capillary vibration, the frequency of the capillary vibration is represented by $f \sim (\sigma/\rho * G^3)^{1/2}$, where ρ represents a density of a molten metal, G represents a gap height between a nozzle and a chill wheel surface where the molten metal puddle forms during processing, and σ represents a surface tension of the molten metal, and the frequency of the capillary vibration is dependent on the gap height, wherein the amorphous foil is tested in a single sheet configuration, and wherein the amorphous foil has reduced losses of core losses less than 0.08 W/kg when tested at 1.4 T, 60 Hz and less than 0.06 W/kg when tested at 1.3 T, 60 Hz.

13. The amorphous foil of claim 5, wherein the amorphous foil has a saturation induction of 1.63 T, and wherein the composition consists essentially of $Fe_{81}B_{14.7}Si_4C_{0.3}$.

14. The amorphous foil of claim 5, wherein the amorphous foil has a saturation induction of 1.56 T, and wherein the composition consists essentially of $Fe_{79}B_{11.6}Si_{9.3}C_{0.1}$.

15. The amorphous foil of claim 1, wherein the amorphous foil has a lamination factor between 0.87 and 0.92.

* * * * *